US009204161B2

(12) United States Patent
Haskell et al.

(10) Patent No.: US 9,204,161 B2
(45) Date of Patent: Dec. 1, 2015

(54) METHOD AND APPARATUS FOR VARIABLE ACCURACY INTER-PICTURE TIMING SPECIFICATION FOR DIGITAL VIDEO ENCODING

(71) Applicant: Apple Inc., Cupertino, CA (US)

(72) Inventors: Barin Geoffry Haskell, Mountain View, CA (US); David William Singer, San Francisco, CA (US); Adriana Dumitras, Santa Clara, CA (US); Atul Puri, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/462,396

(22) Filed: Aug. 18, 2014

(65) Prior Publication Data

US 2015/0049815 A1   Feb. 19, 2015

Related U.S. Application Data

(63) Continuation of application No. 13/339,927, filed on Dec. 29, 2011, now Pat. No. 8,837,580, which is a continuation of application No. 12/689,157, filed on Jan. 18, 2010, now Pat. No. 8,711,924, which is a (Continued)

(51) Int. Cl.
*H04N 7/12*     (2006.01)
*H04N 19/513*   (2014.01)

(Continued)

(52) U.S. Cl.
CPC ............ *H04N 19/513* (2014.11); *G06T 9/005* (2013.01); *H04N 7/26106* (2013.01);

(Continued)

(58) Field of Classification Search
CPC . H04N 7/50; H04N 7/26244; H04N 7/26106; H04N 7/26941
USPC ............. 375/240.23, 240.24, 240.25, 240.26, 375/240.16, 240.01; 382/233, 235, 246, 382/236
See application file for complete search history.

(56) References Cited

U.S. PATENT DOCUMENTS 5,227,878 A   7/1993   Puri et al.
5,394,190 A   2/1995   Yamada
(Continued)

FOREIGN PATENT DOCUMENTS

AU   2003256494   5/2008
AU   2003258142   6/2009
(Continued)

OTHER PUBLICATIONS

U.S. Appl. No. 14/530,516, filed Oct. 31, 2014, Haskell, Barin Geoffry, et al.
(Continued)

*Primary Examiner* — Shawn An
(74) *Attorney, Agent, or Firm* — Adeli LLP

(57) ABSTRACT

A method and apparatus for variable accuracy inter-picture timing specification for digital video encoding is disclosed. Specifically, the present invention discloses a system that allows the relative timing of nearby video pictures to be encoded in a very efficient manner. In one embodiment, the display time difference between a current video picture and a nearby video picture is determined. The display time difference is then encoded into a digital representation of the video picture. In a preferred embodiment, the nearby video picture is the most recently transmitted stored picture. For coding efficiency, the display time difference may be encoded using a variable length coding system or arithmetic coding. In an alternate embodiment, the display time difference is encoded as a power of two to reduce the number of bits transmitted.

20 Claims, 4 Drawing Sheets

Related U.S. Application Data continuation of application No. 11/621,974, filed on Jan. 10, 2007, now Pat. No. 7,668,240, which is a continuation of application No. 10/792,669, filed on Mar. 2, 2004, now Pat. No. 7,292,636, which is a continuation of application No. 10/291,320, filed on Nov. 8, 2002, now Pat. No. 7,088,776.

(60) Provisional application No. 60/396,363, filed on Jul. 15, 2002.

(51) Int. Cl.

| | | |
|---|---|---|
| *H04N 19/61* | (2014.01) | |
| *H04N 19/176* | (2014.01) | |
| *H04N 19/102* | (2014.01) | |
| *G06T 9/00* | (2006.01) | |
| *H04N 19/503* | (2014.01) | |
| *H04N 19/46* | (2014.01) | |
| *H04N 19/51* | (2014.01) | |
| *H04N 19/13* | (2014.01) | |
| *H04N 19/91* | (2014.01) | |
| *H04N 19/132* | (2014.01) | |
| *H04N 19/43* | (2014.01) | |
| *H04N 19/587* | (2014.01) | |
| *H04N 19/577* | (2014.01) | |
| *H04N 19/40* | (2014.01) | |

(52) U.S. Cl.
CPC ............ *H04N 7/26244* (2013.01); *H04N 7/50* (2013.01); *H04N 19/13* (2014.11); *H04N 19/132* (2014.11); *H04N 19/43* (2014.11); *H04N 19/46* (2014.11); *H04N 19/503* (2014.11); *H04N 19/51* (2014.11); *H04N 19/577* (2014.11); *H04N 19/587* (2014.11); *H04N 19/61* (2014.11); *H04N 19/91* (2014.11); *H04N 7/26941* (2013.01)

(56) References Cited

U.S. PATENT DOCUMENTS

| | | | |
|---|---|---|---|
| 5,398,072 A | 3/1995 | Auld | |
| 5,436,664 A | 7/1995 | Henry | |
| 5,483,286 A | 1/1996 | Kim | |
| 5,502,493 A | 3/1996 | Meyer | |
| 5,539,466 A | 7/1996 | Igarashi et al. | |
| 5,642,166 A | 6/1997 | Shin et al. | |
| 5,647,049 A | 7/1997 | Odaka et al. | |
| 5,652,629 A | 7/1997 | Gonzales et al. | |
| 5,737,023 A | 4/1998 | Linzer | |
| 5,745,181 A | 4/1998 | Wilkinson | |
| 5,745,183 A | 4/1998 | Lam | |
| 5,812,199 A | 9/1998 | Lu et al. | |
| 6,018,368 A | 1/2000 | Kim et al. | |
| 6,040,861 A | 3/2000 | Boroczky et al. | |
| 6,057,893 A | 5/2000 | Kojima et al. | |
| 6,072,834 A | 6/2000 | Kim et al. | |
| 6,075,576 A | 6/2000 | Tan et al. | |
| 6,088,485 A | 7/2000 | Kadono | |
| 6,108,047 A | 8/2000 | Chen | |
| 6,219,103 B1 | 4/2001 | Sugiyama | |
| 6,271,774 B1 | 8/2001 | Kato | |
| 6,295,377 B1 | 9/2001 | Dufaux et al. | |
| 6,297,852 B1 * | 10/2001 | Laksono et al. ............. 348/584 |
| 6,317,460 B1 | 11/2001 | Lee | |
| 6,339,619 B1 | 1/2002 | Sugiyama | |
| 6,393,059 B1 | 5/2002 | Sugiyama | |
| 6,400,768 B1 | 6/2002 | Nagumo et al. | |
| 6,539,120 B1 | 3/2003 | Sita et al. | |
| 6,552,749 B1 | 4/2003 | Jones, Jr. et al. | |
| 6,591,015 B1 | 7/2003 | Yasunari et al. | |
| 6,728,315 B2 * | 4/2004 | Haskell et al. ........... 375/240.16 |
| 6,757,014 B1 | 6/2004 | Kasahara | |
| 6,831,951 B2 | 12/2004 | Yamada | |
| 6,859,609 B1 | 2/2005 | Watkins | |
| 6,937,771 B2 | 8/2005 | Kondo et al. | |
| 7,088,776 B2 | 8/2006 | Haskell et al. | |
| 7,257,312 B2 | 8/2007 | Lin et al. | |
| 7,266,150 B2 | 9/2007 | Demos | |
| 7,292,636 B2 * | 11/2007 | Haskell et al. ........... 375/240.23 |
| 7,339,991 B2 * | 3/2008 | Haskell et al. ........... 375/240.16 |
| 7,548,584 B2 * | 6/2009 | Haskell et al. ........... 375/240.23 |
| 7,551,674 B2 * | 6/2009 | Haskell et al. ........... 375/240.23 |
| 7,668,240 B2 * | 2/2010 | Haskell et al. ........... 375/240.01 |
| 7,801,217 B2 | 9/2010 | Boyce | |
| 7,826,528 B2 | 11/2010 | Haskell et al. | |
| 7,903,730 B2 * | 3/2011 | Haskell et al. ........... 375/240.01 |
| 7,940,845 B2 | 5/2011 | Kondo et al. | |
| 8,009,736 B2 | 8/2011 | Haskell et al. | |
| 8,009,737 B2 | 8/2011 | Haskell et al. | |
| 8,077,779 B2 | 12/2011 | Haskell et al. | |
| 8,090,023 B2 | 1/2012 | Haskell et al. | |
| 8,090,026 B2 | 1/2012 | Haskell et al. | |
| 8,094,724 B2 | 1/2012 | Haskell et al. | |
| 8,094,729 B2 | 1/2012 | Haskell et al. | |
| 8,254,461 B2 | 8/2012 | Haskell et al. | |
| 8,630,339 B2 | 1/2014 | Haskell et al. | |
| 8,654,857 B2 | 2/2014 | Haskell et al. | |
| 8,711,924 B2 | 4/2014 | Haskell et al. | |
| 8,737,462 B2 | 5/2014 | Haskell et al. | |
| 8,737,468 B2 | 5/2014 | Haskell et al. | |
| 8,737,483 B2 | 5/2014 | Haskell et al. | |
| 8,737,484 B2 | 5/2014 | Haskell et al. | |
| 8,743,951 B2 | 6/2014 | Haskell et al. | |
| 8,817,880 B2 | 8/2014 | Haskell et al. | |
| 8,817,883 B2 * | 8/2014 | Haskell et al. ........... 375/240.23 |
| 8,817,888 B2 | 8/2014 | Haskell et al. | |
| 8,824,559 B2 | 9/2014 | Haskell et al. | |
| 8,824,565 B2 | 9/2014 | Haskell et al. | |
| 8,831,106 B2 | 9/2014 | Haskell et al. | |
| 8,837,580 B2 | 9/2014 | Haskell et al. | |
| 8,837,597 B2 | 9/2014 | Haskell et al. | |
| 8,837,603 B2 | 9/2014 | Haskell et al. | |
| 8,885,732 B2 | 11/2014 | Haskell et al. | |
| 8,934,546 B2 | 1/2015 | Haskell et al. | |
| 8,934,547 B2 | 1/2015 | Haskell et al. | |
| 8,934,551 B2 | 1/2015 | Haskell et al. | |
| 8,938,008 B2 | 1/2015 | Haskell et al. | |
| 8,942,287 B2 | 1/2015 | Haskell et al. | |
| 2003/0198392 A1 | 10/2003 | Jiang et al. | |
| 2003/0202586 A1 | 10/2003 | Jeon | |
| 2004/0008784 A1 | 1/2004 | Kikuchi et al. | |
| 2004/0234143 A1 | 11/2004 | Hagai et al. | |
| 2004/0247031 A1 | 12/2004 | Hagai et al. | |
| 2009/0022225 A1 | 1/2009 | Haskell et al. | |
| 2011/0243238 A1 * | 10/2011 | Haskell et al. ........... 375/240.16 |
| 2011/0243239 A1 * | 10/2011 | Haskell et al. ........... 375/240.16 |
| 2011/0243240 A1 * | 10/2011 | Haskell et al. ........... 375/240.16 |
| 2011/0243241 A1 * | 10/2011 | Haskell et al. ........... 375/240.16 |
| 2011/0243243 A1 * | 10/2011 | Haskell et al. ........... 375/240.16 |
| 2011/0249752 A1 | 10/2011 | Haskell et al. | |
| 2011/0249753 A1 * | 10/2011 | Haskell et al. ........... 375/240.16 |
| 2012/0093228 A1 | 4/2012 | Haskell et al. | |

FOREIGN PATENT DOCUMENTS

| | | |
|---|---|---|
| AU | 2008201106 | 6/2011 |
| AU | 2009202255 | 1/2012 |
| AU | 2011265362 | 1/2012 |
| AU | 2011202000 | 1/2014 |
| CA | 2784948 | 6/2004 |
| CA | 2491741 | 6/2010 |
| CA | 2502004 | 10/2012 |
| CA | 2629246 | 9/2013 |
| EP | 1014729 | 6/2000 |
| EP | 1111934 | 6/2001 |
| EP | 1120969 | 8/2001 |
| EP | 1406453 | 4/2004 |
| EP | 1579689 | 9/2005 |
| EP | 1976299 | 10/2008 |
| EP | 1532746 | 11/2010 |

(56) References Cited

FOREIGN PATENT DOCUMENTS

| | | |
|---|---|---|
| EP | 2276181 | 1/2011 |
| EP | 11155484 | 2/2011 |
| EP | 11155497 | 2/2011 |
| EP | 2317662 | 5/2011 |
| EP | 2326020 | 5/2011 |
| EP | 2328277 | 6/2011 |
| EP | 2328278 | 6/2011 |
| EP | 2328279 | 6/2011 |
| EP | 2328280 | 6/2011 |
| EP | 2328281 | 6/2011 |
| EP | 2328282 | 6/2011 |
| EP | 2328284 | 6/2011 |
| EP | 2343815 | 7/2011 |
| EP | 2343816 | 7/2011 |
| EP | 2343817 | 7/2011 |
| EP | 2343818 | 7/2011 |
| EP | 2343819 | 7/2011 |
| EP | 2343820 | 7/2011 |
| EP | 2343821 | 7/2011 |
| EP | 2343822 | 7/2011 |
| EP | 2343823 | 7/2011 |
| EP | 2343824 | 7/2011 |
| EP | 2343825 | 7/2011 |
| EP | 2343826 | 7/2011 |
| EP | 2343827 | 7/2011 |
| EP | 2343828 | 7/2011 |
| EP | 2343830 | 7/2011 |
| EP | 2343896 | 7/2011 |
| EP | 2346177 | 7/2011 |
| EP | 2346178 | 7/2011 |
| EP | 2346179 | 7/2011 |
| EP | 2346180 | 7/2011 |
| EP | 2346181 | 7/2011 |
| EP | 2346182 | 7/2011 |
| EP | 2346183 | 7/2011 |
| EP | 2346184 | 7/2011 |
| EP | 2346185 | 7/2011 |
| EP | 2346186 | 7/2011 |
| EP | 2346187 | 7/2011 |
| EP | 2363963 | 9/2011 |
| EP | 2326019 | 8/2012 |
| EP | 2328283 | 8/2012 |
| EP | 2343829 | 8/2012 |
| EP | 2276180 | 9/2012 |
| JP | H06-319112 | 11/1994 |
| JP | 8-149479 | 6/1996 |
| JP | H08-336148 | 12/1996 |
| JP | 10-174065 | 6/1998 |
| JP | 10-215449 | 8/1998 |
| JP | 2001-5958 | 1/2001 |
| JP | 2001-069530 | 3/2001 |
| JP | 2001-136528 | 5/2001 |
| JP | 2001-251620 | 9/2001 |
| JP | 2004-023458 | 1/2004 |
| KR | 1999-0036646 | 5/1999 |
| KR | 1999-0078197 | 10/1999 |
| KR | 10-0233764 | 12/1999 |
| KR | 10-0274434 | 12/2000 |
| KR | 2001-0112806 | 12/2001 |
| SG | 110332 | 4/2007 |
| SG | 112223 | 1/2008 |
| SG | 168406 | 10/2011 |
| SG | 179316 | 4/2012 |
| WO | WO 2004/008654 | 1/2004 |
| WO | WO 2004/032357 | 4/2004 |
| WO | WO 2004/054257 | 6/2004 |

OTHER PUBLICATIONS

Portions of prosecution history of U.S. Appl. No. 13/161,478, Dec. 18, 2014, Haskell, Barin Geoffry, et al.
Portions of prosecution history of U.S. Appl. No. 13/161,480, Dec. 16, 2014, Haskell, Barin Geoffry, et al.
Portions of prosecution history of U.S. Appl. No. 13/161,486, Jan. 7, 2015, Haskell, Barin Geoffry, et al.
Portions of prosecution history of U.S. Appl. No. 13/334,843, Nov. 13, 2014, Haskell, Barin Geoffry, et al.
Portions of prosecution history of U.S. Appl. No. 10/313,773, Dec. 2, 2003, Haskell, Barin Geoffry, et al.
Portions of prosecution history of U.S. Appl. No. 10/291,320, Mar. 6, 2006, Haskell, Barin Geoffry, et al.
Portions of prosecution history of U.S. Appl. No. 11/621,971, Jun. 25, 2010, Haskell, Barin Geoffry, et al.
Portions of prosecution history of U.S. Appl. No. 11/621,977, Nov. 7, 2011, Haskell, Barin Geoffry, et al.
Portions of prosecution history of U.S. Appl. No. 11/621,980, Sep. 29, 2011, Haskell, Barin Geoffry, et al.
Portions of prosecution history of U.S. Appl. No. 11/835,732, Aug. 17, 2011, Haskell, Barin Geoffry, et al.
Portions of prosecution history of U.S. Appl. No. 11/835,727, Sep. 28, 2011, Haskell, Barin Geoffry, et al.
Portions of prosecution history of U.S. Appl. No. 11/621,979, Sep. 15, 2011, Haskell, Barin Geoffry, et al.
Portions of prosecution history of U.S. Appl. No. 12/972,419, Dec. 17, 2013, Haskell, Barin Geoffry, et al.
Portions of prosecution history of U.S. Appl. No. 13/334,818, Jan. 22, 2014, Haskell, Barin Geoffry, et al.
Portions of prosecution history of U.S. Appl. No. 12/689,157, Mar. 28, 2014, Haskell, Barin Geoffry, et al.
Portions of prosecution history of U.S. Appl. No. 13/340,043, Jan. 17, 2014, Haskell, Barin Geoffry, et al.
Portions of prosecution history of U.S. Appl. No. 13/339,899, Apr. 28, 2014, Haskell, Barin Geoffry, et al.
Portions of prosecution history of U.S. Appl. No. 13/334,716, Jan. 2, 2014, Haskell, Barin Geoffry, et al.
Portions of prosecution history of U.S. Appl. No. 13/339,890, Jan. 10, 2014, Haskell, Barin Geoffry, et al.
Portions of prosecution history of U.S. Appl. No. 13/340,035, Apr. 28, 2014, Haskell, Barin Geoffry, et al.
Portions of prosecution history of U.S. Appl. No. 13/161,494, Aug. 1, 2014, Haskell, Barin Geoffry, et al.
Portions of prosecution history of U.S. Appl. No. 13/161,474, Aug. 1, 2014, Haskell, Barin Geoffry, et al.
Portions of prosecution history of U.S. Appl. No. 13/335,598, Jul. 25, 2014, Haskell, Barin Geoffry, et al.
Portions of prosecution history of U.S. Appl. No. 13/161,473, Aug. 1, 2014, Haskell, Barin Geoffry, et al.
Portions of prosecution history of U.S. Appl. No. 13/335,741, Jul. 25, 2014, Haskell, Barin Geoffry, et al.
Portions of prosecution history of U.S. Appl. No. 13/339,927, Aug. 14, 2014, Haskell, Barin Geoffry, et al.
Portions of prosecution history of U.S. Appl. No. 13/339,864, Aug. 13, 2014, Haskell, Barin Geoffry, et al.
Portions of prosecution history of U.S. Appl. No. 13/161,491, Aug. 14, 2014, Haskell, Barin Geoffry, et al.
Portions of prosecution history of U.S. Appl. No. 13/161,476, Sep. 23, 2014, Haskell, Barin Geoffry, et al.
Portions of prosecution history of U.S. Appl. No. 13/161,481, Dec. 16, 2014, Haskell, Barin Geoffry, et al.
Portions of prosecution history of U.S. Appl. No. 13/161,482, Dec. 16, 2014, Haskell, Barin Geoffry, et al.
Portions of prosecution history of U.S. Appl. No. 13/161,484, Dec. 16, 2014, Haskell, Barin Geoffry, et al.
Portions of prosecution history of EP11155497, Jun. 28, 2011 (completion date), Apple Inc.
Portions of prosecution history of EP03812763, Jun. 6, 2013 (mailing date), Apple Inc.
Portions of prosecution history of EP08005966, Jul. 17, 2013 (mailing date), Apple Inc.
Portions of prosecution history of EP10177289, May 6, 2014 (mailing date), Apple Inc.
Portions of prosecution history of EP11152144, Jun. 12, 2014 (mailing date), Apple Inc.
Portions of prosecution history of EP11152176, Jun. 10, 2014 (mailing date), Apple Inc.
Portions of prosecution history of EP11155377, Jun. 15, 2011 (mailing date), Apple Inc.

(56) References Cited

OTHER PUBLICATIONS

Portions of prosecution history of EP11155385, Jun. 14, 2011 (mailing date), Apple Inc.
Portions of prosecution history of EP11155388, Jun. 15, 2011 (mailing date), Apple Inc.
Portions of prosecution history of EP11155462, Jun. 12, 2014 (mailing date), Apple Inc.
Portions of prosecution history of EP11155463, Jun. 14, 2011 (mailing date), Apple Inc.
Portions of prosecution history of EP11155464, Jun. 14, 2011 (mailing date), Apple Inc.
Portions of prosecution history of EP11155498, Jun. 15, 2011 (mailing date), Apple Inc.
Portions of prosecution history of EP11155494, Jun. 14, 2011 (mailing date), Apple Inc.
Portions of prosecution history of EP11155434, Jun. 14, 2011 (mailing date), Apple Inc.
Portions of prosecution history of EP11155437, Jun. 14, 2011 (mailing date), Apple Inc.
Portions of prosecution history of EP11155496, Jun. 14, 2011 (mailing date), Apple Inc.
Portions of prosecution history of EP11155487, Jun. 14, 2011 (mailing date), Apple Inc.
Portions of prosecution history of EP11155442, Jun. 14, 2011 (mailing date), Apple Inc.
Portions of prosecution history of EP11155444, Jun. 14, 2011 (mailing date), Apple Inc.
Portions of prosecution history of EP11155448, Jun. 14, 2011 (mailing date), Apple Inc.
Portions of prosecution history of EP11155479, Jun. 14, 2011 (mailing date), Apple Inc.
Portions of prosecution history of EP11155489, Jun. 14, 2011 (mailing date), Apple Inc.
Portions of prosecution history of EP11155490, Jun. 14, 2011 (mailing date), Apple Inc.
Portions of prosecution history of EP11155492, Jun. 14, 2011 (mailing date), Apple Inc.
Portions of prosecution history of EP11155493, Jun. 12, 2014 (mailing date), Apple Inc.
Portions of prosecution history of EP11155440, Jun. 10, 2014 (mailing date), Apple Inc.
Portions of prosecution history of EP11155491, May 6, 2014 (mailing date), Apple Inc.
Portions of prosecution history of EP11155445, Jun. 14, 2011 (mailing date), Apple Inc.
Portions of prosecution history of EP11155376, Jun. 14, 2011 (mailing date), Apple Inc.
Portions of prosecution history of EP11155378, Jun. 15, 2011 (mailing date), Apple Inc.
Portions of prosecution history of EP11155381, Jun. 15, 2011 (mailing date), Apple Inc.
Portions of prosecution history of EP11155408, Jun. 14, 2011 (mailing date), Apple Inc.
Portions of prosecution history of EP11155409, Jun. 14, 2011 (mailing date), Apple Inc.
Portions of prosecution history of EP11155414, Jun. 14, 2011 (mailing date), Apple Inc.
Portions of prosecution history of EP11155431, Jun. 14, 2011 (mailing date), Apple Inc.
Portions of prosecution history of EP11155383, Jun. 15, 2011 (mailing date), Apple Inc.
Portions of prosecution history of EP11155384, Jun. 14, 2011 (mailing date), Apple Inc.
Portions of prosecution history of EP11155386, Jun. 15, 2011 (mailing date), Apple Inc.
Portions of prosecution history of EP11155387, Jun. 15, 2011 (mailing date), Apple Inc.
Portions of prosecution history of EP11155447, Jun. 10, 2014 (mailing date), Apple Inc.
Portions of prosecution history of AU2011265362, Jul. 1, 2013 (mailing date), Apple Inc.
Portions of prosecution history of CA2784948, May 30, 2013 (mailing date), Apple Inc.
Portions of prosecution history of 201006997-9, Feb. 12, 2011 (mailing date), Apple Inc.
Portions of prosecution history of AU2003256494, May 8, 2008 (mailing date), Apple Inc.
Portions of prosecution history of AU2003258142, Jun. 18, 2009 (mailing date), Apple Inc.
Portions of prosecution history of AU2008201106, Jan. 31, 2011 (mailing date), Apple Inc.
Portions of prosecution history of AU2009202255, Jan. 19, 2012 (mailing date), Apple Inc.
Portions of prosecution history of AU2011202000, Sep. 12, 2013 (mailing date), Apple Inc.
Portions of prosecution history of CA2491741, Nov. 2, 2009 (mailing date), Apple Inc.
Portions of prosecution history of CA2502004, Jul. 15, 2011 (mailing date), Apple Inc.
Portions of prosecution history of CA2629246, Dec. 24, 2012 (mailing date), Apple Inc.
Portions of prosecution history of EP03764499, Oct. 7, 2010 (mailing date), Apple Inc.
Portions of prosecution history of EP10177276, Aug. 9, 2012 (mailing date), Apple Inc.
Portions of prosecution history of EP11152174, Aug. 2, 2012 (mailing date), Apple Inc.
Portions of prosecution history of EP11155467, Aug. 2, 2012 (mailing date), Apple Inc.
Portions of prosecution history of EP11155441, Aug. 2, 2012 (mailing date), Apple Inc.
Portions of prosecution history of 200500663-0, Apr. 16, 2007 (mailing date), Apple Inc.
Portions of prosecution history of 200502548-1, Jul. 6, 2007 (mailing date), Apple Inc.
Portions of prosecution history of 200702807-9, Sep. 19, 2011 (mailing date), Apple Inc.
International Search Report of PCT/US2003/021714, Nov. 14, 2003 (mailing date), Apple Computer, Inc.
Written Opinion of PCT/US2003/021714, Apr. 21, 2004 (mailing date), Apple Computer, Inc.
International Preliminary Examination Report of PCT/US2003/021714, Sep. 2, 2004 (completion date), Apple Computer, Inc.
International Search Report of PCT/US2003/024953, Jan. 27, 2004 (mailing date), Apple Computer, Inc.
International Preliminary Examination Report of PCT/US2003/024953, Mar. 17, 2004 (completion date), Apple Computer, Inc.
Author Unknown, "Working Draft No. 2, Revision 2 (WD-2)," Joint Video Team of ISO/IEC MPEG and ITU-T VCEG, Jan. 29-Feb. 1, 2002, pp. 1-106, Geneva, Switzerland, JVT-B118r2.
Chen, Zhibo, et al., "Fast Motion Estimation for JVT," ISO/IEC JTC 1/SC29/WG11 and ITU-T SG16 Q.6, Mar. 7-14, 2003, 12 pages, Pattaya II, Thailand, JVT-G016.
Cote, Guy, et al., "H.263+: Video Coding at Low Bit Rates," IEEE Trans. on Circuits and Systems for Video Technology, Nov. 1998, pp. 849-866, vol. 8, No. 7, IEEE.
Haskell, Barry G., et al.,"Variable Accuracy Inter-Picture Timing Specification for Video," Joint Video Team (JVT) of ISO/IEC MPEG & ITU-T VCEG (ISO/IEC JTC1/SC29/WG11 and ITU-T SG16 Q.6), Jul. 22-26, 2002, 12 pages, Klagenfurt, Austria, JVT-D124r1.
Horowitz, Michael, et al., "H.264/AVC Baseline Profile Decoder Complexity Analysis," IEEE Trans. on Circuits and Systems for Video Technology, Jul. 2003, pp. 704-716, vol. 13, No. 7, IEEE.
ISO/IEC, "Information Technology—Coding of Audio-Visual Objects—Part 2: Visual," Dec. 1, 2001, 536 pages, ISO/IEC, Geneva, Switzerland.
ISO/IEC, "Information Technology—Coding of Audio-Visual Objects—Part 10: Advanced Video Coding, Second Edition" Oct. 1, 2004, 280 pages, ISO/IEC, Geneva, Switzerland.
ISO/IEC, "Information Technology—Coding of Moving Pictures and Associated Audio for Digital Storage Media at up to About 1,5 mbits/s—Part 2: Video," 11172-2:1993, Aug. 2006, 3 pages.

(56) References Cited

OTHER PUBLICATIONS

ISO/IEC, "MPEG Continues Its Work Across All Aspects of Its Multimedia Charter," available at http://mpeg.chiariglione.org/meetings/klagenfurt/klagenfurt_press.htm, Jul. 29, 2002, 2 pages, Klagenfurt, Austria.

ISO/IEC, "MPEG-4 Video Verification Model Version 18.0," Jan. 2001, 412 pages, Pisa, Italy.

ISO/IEC, "Report of the Formal Verification Tests on AVC, (ISO/IEC 14496-10 ITU-T Rec. H.264)," Dec. 2003, 27 pages, Waikoloa, HI.

ISO/IEC, "Text of Committee Draft of Joint Video Specification (ITU-T Rec. H.264/ ISO/IEC 14496-10 AVC)," May 6-10, 2002, 142 pages, JVT, Fairfax, VA, JVT-C167.

ISO/IEC, "Text of Final Committee Draft of Joint Video Specification (ITU-T Rec. H.264/ ISO/IEC 14496-10 AVC)," Jul. 2002, 213 pages, JVT, Klagenfurt, Austria.

ISO/IEC, "Information Technology—Generic Coding of Moving Pictures and Associated Audio Information: Video," 13818-2, Month Unknown, 1995, 255 pages.

ITU-T, "Series H: Audiovisual and Multimedia Systems—Infrastructure of Audiovisual Services—Coding of Moving Video—Advanced Video Coding for Generic Audiovisual Services," May 2003, 281 pages, ITU.

ITU-T, "Series H: Audiovisual and Multimedia Systems—Infrastructure of Audiovisual Services—Coding of Moving Video—Video Coding for Low Bit Rate Communication," Recommendation H.263 Version 2, Feb. 1998, 167 pages.

ITU-T, "Transmission of Non-Telephone Signals—Video Coding for Low Bit Rate Communication," Recommendation H.263, Mar. 1996, 52 pages, ITU.

Jeon, Byeong-Moon, "B picture coding for sequence with repeating scene changes," Joint Video Team (JVT) of ISO/IEC MPEG & ITU-T VCEG (ISO/IEC JTC1/SC29/WG11 and ITU-T SG16 Q.6), May 6-10, 2002, 10 pages, Fairfax, VA, JVT-C120.

Jeon, Byeong-Moon, "Clean Up for Temporal Direct Mode," Joint Video Team (JVT) of ISO/IEC MPEG & ITU-T VCEG (ISO/IEC JTC1/SC29/WG11 and ITU-T SG16 Q.6), Oct. 9-17, 2002, 12 pages, Geneva, Switzerland, JVT-E097.

Joint Video Team (JVT) of ISO/IEC MPEG and ITU-T VCEG, "Working Draft No. 2, Revision 0 (WD-2)," Joint Video Team (JVT) of ISO/IEC MPEG and ITU-T VCEG, Dec. 3-7, 2001, 105 pages, Pattaya, Thailand, JVT-B118.

Joint Video Team (JVT) of ISO/IEC MPEG and ITU-T VCEG, "Working Draft No. 2, Revision 0 (WD-2)," Joint Video Team (JVT) of ISO/IEC MPEG and ITU-T VCEG, Jan. 29-Feb. 1, 2002, 100 pages, Geneva, Switzerland, JVT-B118r1.

Kondo, Satoshi, et al., "New Prediction Method to Improve B-picture Coding Efficiency," ITU-Telecommunications Standardization Sector, Dec. 4-6, 2001, 12 pages, Pattaya, Thailand, VCEG-O26.

Kondo, Satoshi, et al., "Proposal of Minor Changes to Multi-Fram Buffering Syntax for Improving Coding Efficiency of B-pictures," Joint Video Team (JVT) of ISO/IEC MPEG & ITU-T VCEG, Jan. 29-Feb. 1, 2002, 10 pages, Geneva, Switzerland, JVT-B057.

Leung, Kwong-Keung, et al., "Parallelization Methodology for Video Coding—An Implementation on TMS32OC8O," IEEE Trans. on Circuits and Systems for Video Technology, Dec. 2000, pp. 1413-1425, vol. 10, No. 8.

Schlockermann, Martin, et al., "Improvement of Temporal Direct Mode," Joint Video Team (JVT) of ISO/IEC MPEG & ITU-T VCEG (ISO/IEC JTC1/SC29/WG11 and ITU-T SG16 Q.6), Oct. 9-17, 2002, 12 pages, Geneva, Switzerland, JVT-E144.

Sullivan, Gary, "(Draft) Report of Fairfax Meeting," Joint Video Team (JVT) of ISO/IEC MPEG & ITU-T VCEG, May 6-10, 2002, 48 pages, Fairfax, VA, JVT-C001d3.

WG11(MPEG), "MPEG-4 Overview—(V.21—Jeju Version)—Overview of the MPEG-4 Standard," Mar. 2002, 79 pages, MPEG.

Wiegand, Thomas, et al., "Introduction to the Special Issue on the H.264/AVC Video Coding Standard—Overview of the H.264/AVC Video Coding Standard," IEEE Trans. on Circuits and Systems for Video Technology, Jul. 2003, pp. 557-576, vol. 13, No. 7, IEEE.

\* cited by examiner

METHOD AND APPARATUS FOR VARIABLE ACCURACY INTER-PICTURE TIMING SPECIFICATION FOR DIGITAL VIDEO ENCODING

CLAIM OF BENEFIT TO PRIOR APPLICATIONS

This application is a continuation of U.S. patent application Ser. No. 13/339,927, filed Dec. 29, 2011, now issued as U.S. Pat. No. 8,837,580. U.S. patent application Ser. No. 13/339,927 is a continuation application of U.S. patent application Ser. No. 12/689,157, filed Jan. 18, 2010, issued as U.S. Pat. No. 8,711,924. U.S. patent application Ser. No. 12/689,157 is a continuation application of U.S. patent application Ser. No. 11/621,974, filed Jan. 10, 2007, issued as U.S. Pat. No. 7,668,240. U.S. patent application Ser. No. 11/621,974 is a continuation application of U.S. patent application Ser. No. 10/792,669, filed Mar. 2, 2004, issued as U.S. Pat. No. 7,292,636. U.S. patent application Ser. No. 10/792,669 is a continuation application of U.S. patent application Ser. No. 10/291,320, filed Nov. 8, 2002, issued as U.S. Pat. No. 7,088,776. U.S. patent application Ser. No. 10/291,320 claims benefit to U.S. Provisional Patent Application 60/396,363, filed Jul. 15, 2002. U.S. Pat. Nos. 8,837,580, 8,711,924, 7,668,240 and 7,292,636 are incorporated herein by reference.

FIELD OF THE INVENTION

The present invention relates to the field of multimedia compression systems. In particular the present invention discloses methods and systems for specifying variable accuracy inter-picture timing.

BACKGROUND OF THE INVENTION

Digital based electronic media formats are finally on the cusp of largely replacing analog electronic media formats. Digital compact discs (CDs) replaced analog vinyl records long ago. Analog magnetic cassette tapes are becoming increasingly rare. Second and third generation digital audio systems such as Mini-discs and MP3 (MPEG Audio-layer 3) are now taking market share from the first generation digital audio format of compact discs.

The video media has been slower to move to digital storage and transmission formats than audio. This has been largely due to the massive amounts of digital information required to accurately represent video in digital form. The massive amounts of digital information needed to accurately represent video require very high-capacity digital storage systems and high-bandwidth transmission systems.

However, video is now rapidly moving to digital storage and transmission formats. Faster computer processors, high-density storage systems, and new efficient compression and encoding algorithms have finally made digital video practical at consumer price points. The DVD (Digital Versatile Disc), a digital video system, has been one of the fastest selling consumer electronic products in years. DVDs have been rapidly supplanting Video-Cassette Recorders (VCRs) as the pre-recorded video playback system of choice due to their high video quality, very high audio quality, convenience, and extra features. The antiquated analog NTSC (National Television Standards Committee) video transmission system is currently in the process of being replaced with the digital ATSC (Advanced Television Standards Committee) video transmission system.

Computer systems have been using various different digital video encoding formats for a number of years. Among the best digital video compression and encoding systems used by computer systems have been the digital video systems backed by the Motion Pictures Expert Group commonly known by the acronym MPEG. The three most well known and highly used digital video formats from MPEG are known simply as MPEG-1, MPEG-2, and MPEG-4. VideoCDs (VCDs) and early consumer-grade digital video editing systems use the early MPEG-1 digital video encoding format. Digital Versatile Discs (DVDs) and the Dish Network brand Direct Broadcast Satellite (DBS) television broadcast system use the higher quality MPEG-2 digital video compression and encoding system. The MPEG-4 encoding system is rapidly being adapted by the latest computer based digital video encoders and associated digital video players.

The MPEG-2 and MPEG-4 standards compress a series of video frames or video fields and then encode the compressed frames or fields into a digital bitstream. When encoding a video frame or field with the MPEG-2 and MPEG-4 systems, the video frame or field is divided into a rectangular grid of macroblocks. Each macroblock is independently compressed and encoded.

When compressing a video frame or field, the MPEG-4 standard may compress the frame or field into one of three types of compressed frames or fields: Infra-frames (I-frames), Unidirectional Predicted frames (P-frames), or Bi-Directional Predicted frames (B-frames). Intra-frames completely independently encode an independent video frame with no reference to other video frames. P-frames define a video frame with reference to a single previously displayed video frame. B-frames define a video frame with reference to both a video frame displayed before the current frame and a video frame to be displayed after the current frame. Due to their efficient usage of redundant video information, P-frames and B-frames generally provide the best compression.

SUMMARY OF THE INVENTION

A method and apparatus for variable accuracy inter-picture timing specification for digital video encoding is disclosed. Specifically, the present invention discloses a system that allows the relative timing of nearby video pictures to be encoded in a very efficient manner. In one embodiment, the display time difference between a current video picture and a nearby video picture is determined. The display time difference is then encoded into a digital representation of the video picture. In a preferred embodiment, the nearby video picture is the most recently transmitted stored picture.

For coding efficiency, the display time difference may be encoded using a variable length coding system or arithmetic coding. In an alternate embodiment, the display time difference is encoded as a power of two to reduce the number of bits transmitted.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

A method and system for specifying Variable Accuracy Inter-Picture Timing in a multimedia compression and encoding system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the MPEG-4 multimedia compression and encoding system. However, the same techniques can easily be applied to other types of compression and encoding systems.

Multimedia Compression and Encoding Overview

Figure 1:
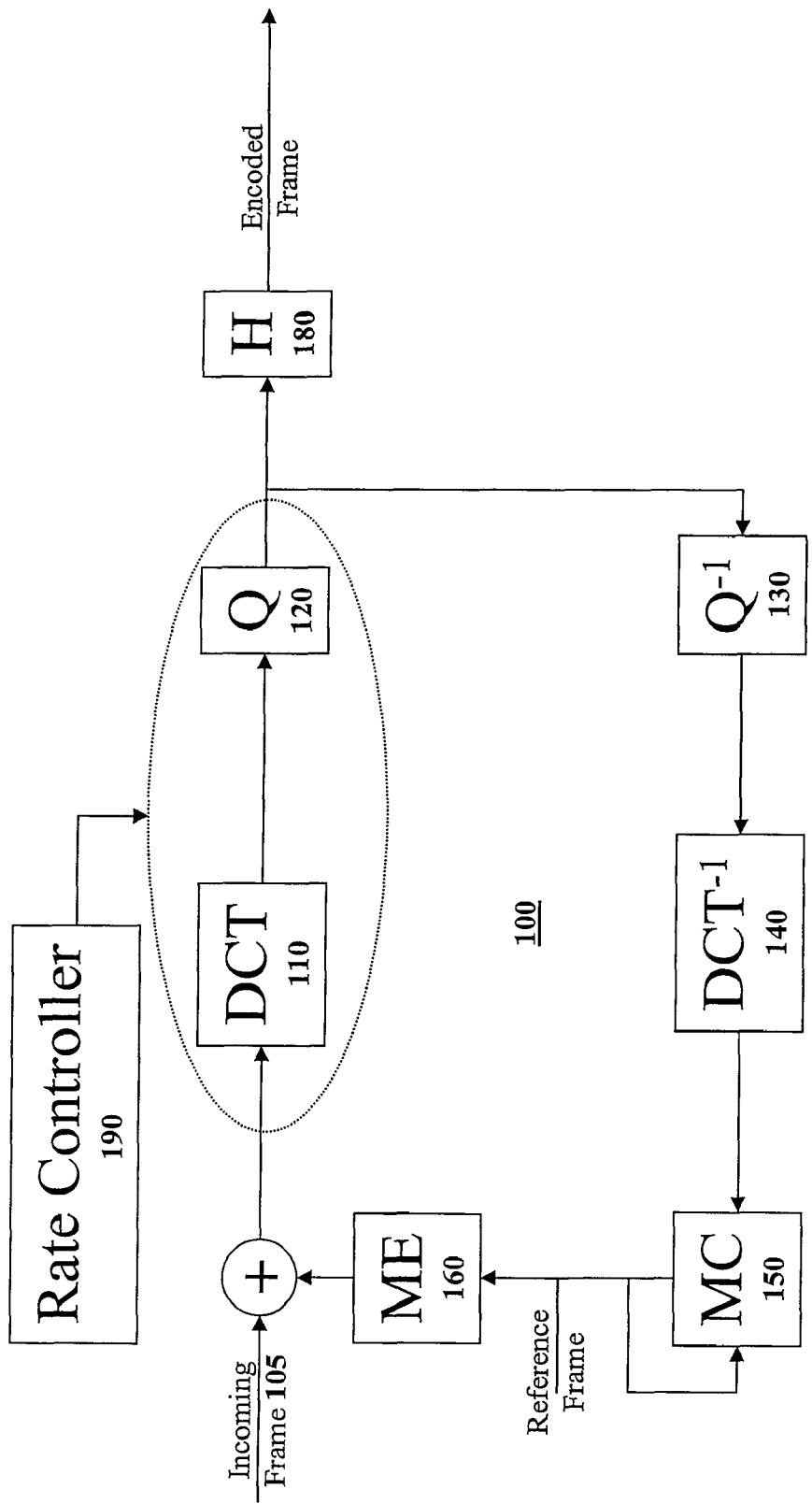
FIG. 1 illustrates a high-level block diagram of one possible a digital video encoder system.

FIG. 1 illustrates a high-level block diagram of a typical digital video encoder 100 as is well known in the art. The digital video encoder 100 receives an incoming video stream of video frames 105 at the left of the block diagram. Each video frame is processed by a Discrete Cosine Transformation (DCT) unit 110. The frame may be processed independently (an intra-frame) or with reference to information from other frames received from the motion compensation unit (an inter-frame). Next, a Quantizer (Q) unit 120 quantizes the information from the Discrete Cosine Transformation unit 110. Finally, the quantized video frame is then encoded with an entropy encoder (H) unit 180 to produce an encoded bitstream. The entropy encoder (H) unit 180 may use a variable length coding (VLC) system.

Since an inter-frame encoded video frame is defined with reference to other nearby video frames, the digital video encoder 100 needs to create a copy of how decoded each frame will appear within a digital video decoder such that inter-frames may be encoded. Thus, the lower portion of the digital video encoder 100 is actually a digital video decoder system. Specifically, an inverse quantizer ($Q^{-1}$) unit 130 reverses the quantization of the video frame information and an inverse Discrete Cosine Transformation ($DCT^{-1}$) unit 140 reverses the Discrete Cosine Transformation of the video frame information. After all the DCT coefficients are reconstructed from iDCT, the motion compensation unit will use the information, along with the motion vectors, to reconstruct the encoded frame which is then used as the reference frame for the motion estimation of the next frame.

The decoded video frame may then be used to encode inter-frames (P-frames or B-frames) that are defined relative to information in the decoded video frame. Specifically, a motion compensation (MC) unit 150 and a motion estimation (ME) unit 160 are used to determine motion vectors and generate differential values used to encode inter-frames.

A rate controller 190 receives information from many different components in a digital video encoder 100 and uses the information to allocate a bit budget for each video frame. The rate controller 190 should allocate the bit budget in a manner that will generate the highest quality digital video bit stream that that complies with a specified set of restrictions. Specifically, the rate controller 190 attempts to generate the highest quality compressed video stream without overflowing buffers (exceeding the amount of available memory in a decoder by sending more information than can be stored) or underflowing buffers (not sending video frames fast enough such that a decoder runs out of video frames to display).

Multimedia Compression and Encoding Overview

In some video signals the time between successive video pictures (frames or fields) may not be constant. (Note: This document will use the term video pictures to generically refer to video frames or video fields.) For example, some video pictures may be dropped because of transmission bandwidth constraints. Furthermore, the video timing may also vary due to camera irregularity or special effects such as slow motion or fast motion. In some video streams, the original video source may simply have non-uniform inter-picture times by design. For example, synthesized video such as computer graphic animations may have non-uniform timing since no arbitrary video timing is created by a uniform video capture system such as a video camera system. A flexible digital video encoding system should be able to handle non-uniform timing.

Many digital video encoding systems divide video pictures into a rectangular grid of macroblocks. Each individual macroblock from the video picture is independently compressed and encoded. In some embodiments, sub-blocks of macroblocks known as 'pixelblocks' are used. Such pixel blocks may have their own motion vectors that may be interpolated. This document will refer to macroblocks although the teachings of the present invention may be applied equally to both macroblocks and pixelblocks.

Some video coding standards, e.g., ISO MPEG standards or the ITU H.264 standard, use different types of predicted macroblocks to encode video pictures. In one scenario, a macroblock may be one of three types:
1. I-macroblock—An Intra (I) macroblock uses no information from any other video pictures in its coding (it is completely self-defined);
2. P-macroblock—A unidirectionally predicted (P) macroblock refers to picture information from one preceding video picture; or
3. B-macroblock—A bi-directional predicted (B) macroblock uses information from one preceding picture and one future video picture.

If all the macroblocks in a video picture are Intra-macroblocks, then the video picture is an Intra-frame. If a video picture only includes unidirectional predicted macro blocks or intra-macroblocks, then the video picture is known as a P-frame. If the video picture contains any bi-directional predicted macroblocks, then the video picture is known as a B-frame. For the simplicity, this document will consider the case where all macroblocks within a given picture are of the same type.

An example sequence of video pictures to be encoded might be represented as $I_1 B_2 B_3 B_4 P_5 B_6 B_7 B_8 B_9 P_{10} B_{11} P_{12} B_{13} I_{14} \ldots$ where the letter (I, P, or B) represents if the video picture is an I-frame, P-frame, or B-frame and the number represents the camera order of the video picture in the sequence of video pictures. The camera order is the order in which a camera recorded the video pictures and thus is also the order in which the video pictures should be displayed (the display order).

Figure 2:
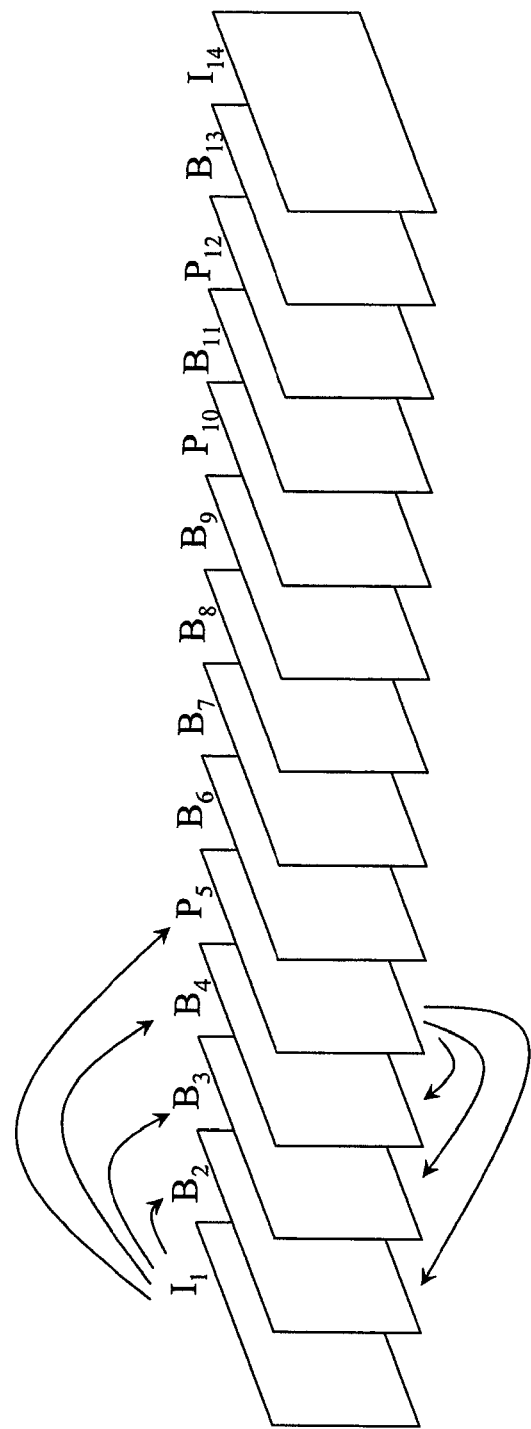
FIG. 2 illustrates a serious of video pictures in the order that the pictures should be displayed wherein the arrows connecting different pictures indicate inter-picture dependency created using motion compensation.

The previous example series of video pictures is graphically illustrated in FIG. 2. Referring to FIG. 2, the arrows indicate that macroblocks from a stored picture (I-frame or P-frame in this case) are used in the motion compensated prediction of other pictures.

In the scenario of FIG. 2, no information from other pictures is used in the encoding of the intra-frame video picture $I_1$. Video picture $P_5$ is a P-frame that uses video information from previous video picture $I_1$ in its coding such that an arrow is drawn from video picture $I_1$ to video picture $P_5$. Video picture $B_2$, video picture $B_3$, video picture $B_4$ all use information from both video picture $I_1$ and video picture $P_5$ in their coding such that arrows are drawn from video picture $I_1$ and video picture $P_5$ to video picture $B_2$, video picture $B_3$, and video picture $B_4$. As stated above the inter-picture times are, in general, not the same.

Since B-pictures use information from future pictures (pictures that will be displayed later), the transmission order is usually different than the display order. Specifically, video pictures that are needed to construct other video pictures should be transmitted first. For the above sequence, the transmission order might be $I_1 P_5 B_2 B_3 B_4 P_{10} B_6 B_7 B_8 B_9 P_{12} B_{11} I_{14} B_{13} \ldots$ FIG. 3 graphically illustrates the above transmission order of the video pictures from FIG. 2. Again, the arrows in the figure indicate that macroblocks from a stored video picture (I or P in this case) are used in the motion compensated prediction of other video pictures.

Figure 3:
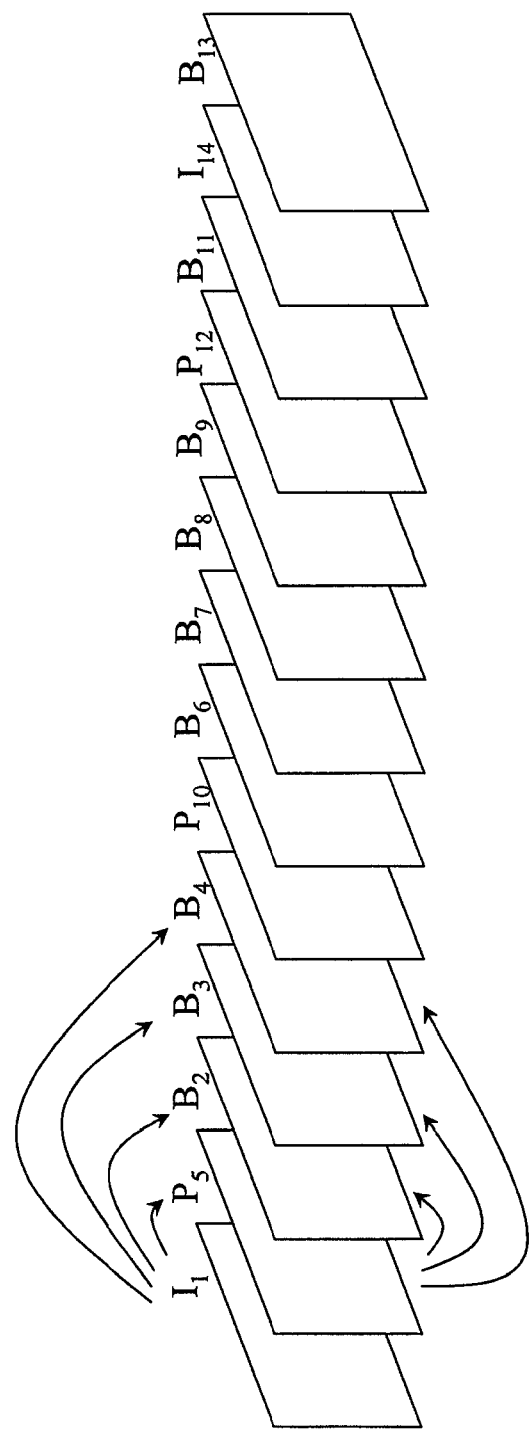
FIG. 3 illustrates the video pictures from FIG. 2 listed in a preferred transmission order of pictures wherein the arrows connecting different pictures indicate inter-picture dependency created using motion compensation.

Referring to FIG. 3, the system first transmits I-frame $I_1$ which does not depend on any other frame. Next, the system transmits P-frame video picture $P_5$ that depends upon video picture $I_1$. Next, the system transmits B-frame video picture $B_2$ after video picture $P_5$ even though video picture $B_2$ will be displayed before video picture $P_5$. The reason for this is that when it comes time to decode $B_2$, the decoder will have already received and stored the information in video pictures $I_1$ and $P_5$ necessary to decode video picture $B_2$. Similarly, video pictures $I_1$ and $P_5$ are ready to be used to decode subsequent video picture $B_3$ and video picture $B_4$. The receiver/decoder reorders the video picture sequence for proper display. In this operation I and P pictures are often referred to as stored pictures.

The coding of the P-frame pictures typically utilizes Motion Compensation, wherein a Motion Vector is computed for each macroblock in the picture. Using the computed motion vector, a prediction macroblock (P-macroblock) can be formed by translation of pixels in the aforementioned previous picture. The difference between the actual macroblock in the P-frame picture and the prediction macroblock is then coded for transmission.

Each motion vector may also be transmitted via predictive coding. For example, a motion vector prediction may be formed using nearby motion vectors. In such a case, then the difference between the actual motion vector and the motion vector prediction is coded for transmission.

Each B-macroblock uses two motion vectors: a first motion vector referencing the aforementioned previous video picture and a second motion vector referencing the future video picture. From these two motion vectors, two prediction macroblocks are computed. The two predicted macroblocks are then combined together, using some function, to form a final predicted macroblock. As above, the difference between the actual macroblock in the B-frame picture and the final predicted macroblock is then encoded for transmission.

As with P-macroblocks, each motion vector (MV) of a B-macroblock may be transmitted via predictive coding. Specifically, a predicted motion vector is formed using nearby motion vectors. Then, the difference between the actual motion vector and the predicted is coded for transmission.

However, with B-macroblocks the opportunity exists for interpolating motion vectors from motion vectors in the nearest stored picture macroblock. Such interpolation is carried out both in the digital video encoder and the digital video decoder.

This motion vector interpolation works particularly well on video pictures from a video sequence where a camera is slowly panning across a stationary background. In fact, such motion vector interpolation may be good enough to be used alone. Specifically, this means that no differential information needs to be calculated or transmitted for these B-macroblock motion vectors encoded using interpolation.

To illustrate further, in the above scenario let us represent the inter-picture display time between pictures i and j as $D_{i,j}$, i.e., if the display times of the pictures are $T_i$ and $T_j$, respectively, then $$D_{i,j} = T_i - T_j$$

from which it follows that $$D_{i,k} = D_{i,j} + D_{j,k}$$

$$D_{i,k} = -D_{k,i}$$

Note that $D_{i,j}$ may be negative in some cases.

Thus, if $MV_{5,1}$ is a motion vector for a $P_5$ macroblock as referenced to then for the corresponding macroblocks in $B_2$, $B_3$ and $B_4$ the motion vectors as referenced to $I_1$ and $P_5$, respectively, would be interpolated by $$MV_{2,1} = MV_{5,1} * D_{2,1}/D_{5,1}$$

$$MV_{5,2} = MV_{5,1} * D_{5,2}/D_{5,1}$$

$$MV_{3,1} = MV_{5,1} * D_{3,1}/D_{5,1}$$

$$MV_{5,3} = MV_{5,1} * D_{5,3}/D_{5,1}$$

$$MV_{5,2} = MV_{5,1} * D_{5,2}/D_{5,1}$$

$$MV_{4,1} = MV_{5,1} * D_{4,1}/D_{5,1}$$

$$MV_{5,4} = MV_{5,1} * D_{5,4}/D_{5,1}$$

Note that since ratios of display times are used for motion vector prediction, absolute display times are not needed. Thus, relative display times may be used for $D_{i,j}$ display time values.

This scenario may be generalized, as for example in the H.264 standard. In the generalization, a P or B picture may use any previously transmitted picture for its motion vector prediction. Thus, in the above case picture $B_3$ may use picture $I_1$ and picture $B_2$ in its prediction. Moreover, motion vectors may be extrapolated, not just interpolated. Thus, in this case we would have:

$$MV_{3,1} = MV_{2,1} * D_{3,1}/D_{2,1}$$

Such motion vector extrapolation (or interpolation) may also be used in the prediction process for predictive coding of motion vectors.

In any event, the problem in the case of non-uniform inter-picture times is to transmit the relative display time values of $D_{i,j}$ to the receiver, and that is the subject of the present invention. In one embodiment of the present invention, for each picture after the first picture we transmit the display time difference between the current picture and the most recently transmitted stored picture. For error resilience, the transmission could be repeated several times within the picture, e.g., in the so-called slice headers of the MPEG or H.264 standards.

If all slice headers are lost, then presumably other pictures that rely on the lost picture for decoding information cannot be decoded either.

Thus, in the above scenario we would transmit the following:

$D_{5,1}\ D_{2,5}\ D_{3,5}\ D_{4,5}\ D_{10,5}\ D_{6,10}\ D_{7,10}\ D_{8,10}\ D_{9,10}\ D_{12,10}\ D_{11,12}\ D_{14,12}\ D_{13,14}\cdots$ For the purpose of motion vector estimation, the accuracy requirements for $D_{i,j}$ may vary from picture to picture. For example, if there is only a single B-frame picture $B_6$ halfway between two P-frame pictures $P_5$ and $P_7$, then it suffices to send only:

$D_{7,5}=2$ and $D_{6,7}=-1$

Where the $D_{i,j}$ display time values are relative time values. If, instead, video picture $B_6$ is only one quarter the distance between video picture $P_5$ and video picture $P_7$ then the appropriate $D_{i,j}$ display time values to send would be:

$D_{7,5}=4$ and $D_{6,7}=-1$

Note that in both of the two preceding examples, the display time between the video picture $B_6$ and video picture video picture $P_7$ is being used as the display time "unit" and the display time difference between video picture $P_5$ and picture video picture $P_7$ is four display time "units".

In general, motion vector estimation is less complex if divisors are powers of two. This is easily achieved in our embodiment if (the inter-picture time) between two stored pictures is chosen to be a power of two as graphically illustrated in FIG. 4. Alternatively, the estimation procedure could be defined to truncate or round all divisors to a power of two.

Figure 4:
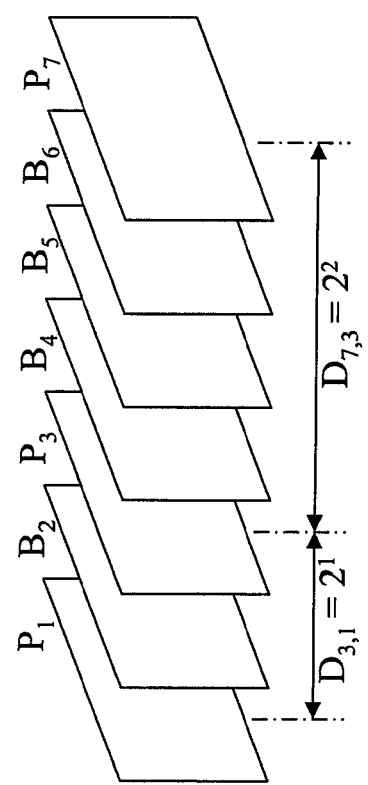
FIG. 4 graphically illustrates a series of video pictures wherein the distances between video pictures that reference each other are chosen to be powers of two.

In the case where an inter-picture time is to be a power of two, the number of data bits can be reduced if only the integer power (of two) is transmitted instead of the full value of the inter-picture time. FIG. 4 graphically illustrates a case wherein the distances between pictures are chosen to be powers of two. In such a case, the $D_{3,1}$ display time value of 2 between video picture $P_1$ and picture video picture $P_3$ is transmitted as 1 (since $2^1=2$) and the $D_{7,3}$ display time value of 4 between video picture $P_7$ and picture video picture $P_3$ can be transmitted as 2 (since $2^2=4$).

In some cases, motion vector interpolation may not be used. However, it is still necessary to transmit the display order of the video pictures to the receiver/player system such that the receiver/player system will display the video pictures in the proper order. In this case, simple signed integer values for $D_{i,j}$ suffice irrespective of the actual display times. In some applications only the sign may be needed.

The inter-picture times $D_{i,j}$ may simply be transmitted as simple signed integer values. However, many methods may be used for encoding the $D_{i,j}$ values to achieve additional compression. For example, a sign bit followed by a variable length coded magnitude is relatively easy to implement and provides coding efficiency.

One such variable length coding system that may be used is known as UVLC (Universal Variable Length Code). The UVLC variable length coding system is given by the code words:

```
1 = 1
2 = 0 1 0
3 = 0 1 1
4 = 0 0 1 0 0
5 = 0 0 1 0 1
6 = 0 0 1 1 0
7 = 0 0 1 1 1
8 = 0 0 0 1 0 0 0 ...
```

Another method of encoding the inter-picture times may be to use arithmetic coding. Typically, arithmetic coding utilizes conditional probabilities to effect a very high compression of the data bits.

Thus, the present invention introduces a simple but powerful method of encoding and transmitting inter-picture display times. The encoding of inter-picture display times can be made very efficient by using variable length coding or arithmetic coding. Furthermore, a desired accuracy can be chosen to meet the needs of the video decoder, but no more.

The foregoing has described a system for specifying variable accuracy inter-picture timing in a multimedia compression and encoding system. It is contemplated that changes and modifications may be made by one of ordinary skill in the art, to the materials and arrangements of elements of the present invention without departing from the scope of the invention.

We claim:

1. A method for encoding a sequence of video pictures, said method comprising:
    encoding a first order value for a first video picture, a second order value for a second video picture, and a third order value for a third video picture, wherein each order value is representative of a position of a video picture in a sequence of video pictures;
    computing a particular value based on a first order difference value and a second order difference value, wherein (i) the first order difference value is representative of a difference between the third order value and the first order value and (ii) the second order difference value is representative of a difference between the second order value and the first order value;
    computing a motion vector associated with the second video picture based on the particular value and a motion vector associated with the third video picture;
    encoding the first, second, and third video pictures, wherein at least one video picture is encoded by using the computed motion vector; and
    storing the encoded first video picture, the encoded second video picture, the encoded third video picture, the encoded first order value, the encoded second order value, and the encoded third order value in a bitstream.

2. The method of claim 1, wherein the particular value is inversely proportional to the first order difference value and directly proportional to the second order difference value.

3. The method of claim 1, wherein the particular value is computed by dividing the second order difference value by the first order difference value.

4. The method of claim 1, wherein the second order value is encoded in a slice header of the bitstream, the slice header associated with the second video picture.

5. The method of claim 1, wherein computing the motion vector associated with the second video picture comprises multiplying the particular value with the motion vector associated with the third video picture.

6. The method of claim 1, wherein the second order value represents a timing difference between the second video picture and the first video picture.

7. The method of claim 1, wherein the second order value is compressed by using variable length coding.

8. The method of claim 1, wherein the second order value is compressed by using arithmetic coding.

9. The method of claim 1, wherein the sequence of video pictures is a sequence for displaying the video pictures.

10. The method of claim 1, wherein computing the motion vector associated with the second video picture comprises performing an interpolation operation based on the motion vector associated with the third video picture.

11. The method of claim 1, wherein computing the motion vector associated with the second video picture comprises performing an extrapolation operation based on the motion vector associated with third video picture.

12. The method of claim 1, wherein the second order value is representative of an order difference value between the second video picture and the first video picture.

13. The method of claim 1, wherein the motion vector associated with the second video picture is not encoded in the bitstream.

14. The method of claim 1, wherein the first video picture is an I-video picture.

15. A method for encoding a video sequence comprising first, second and third video pictures, said method comprising:
computing a particular value based on (i) a first order difference value between an order value for the second video picture and an order value for the first video picture and (ii) a second order difference value between an order value for the third video picture and the order value for the first video picture;
computing a motion vector associated with the second video picture based on the particular value and a motion vector associated with the third video picture, the computed motion vector for encoding at least one video picture;
encoding the first, second, and third video pictures and the order values for the first, second, and third video pictures; and
storing the encoded first video picture, the encoded second video picture, the encoded third video picture, the encoded order value for the first video picture, the encoded order value for the second video picture, and the encoded order value for the third video picture in a bitstream.

16. The method of claim 15, wherein the particular value is computed by dividing the first order difference value by the second order difference value.

17. The method of claim 15, wherein computing the first motion vector comprises multiplying the particular value with the motion vector associated with the third video picture.

18. The method of claim 15, wherein the order value for the second video picture represents a timing difference between the second video picture and the first video picture.

19. The method of claim 15, wherein computing the motion vector associated with the second video picture comprises performing an interpolation operation based on the motion vector associated with the third video picture.

20. The method of claim 15, wherein computing the motion vector associated with the second video picture comprises performing an extrapolation operation based on the motion vector associated with the third video picture.

* * * * *